(12) United States Patent
Liang et al.

(10) Patent No.: US 9,599,988 B2
(45) Date of Patent: Mar. 21, 2017

(54) ADAPTED MOBILE CARRIER AND AUTO FOLLOWING SYSTEM

(71) Applicant: PIXART IMAGING INC., Hsin-Chu County (TW)

(72) Inventors: Chia-Cheun Liang, Hsin-Chu County (TW); Ming-Tsan Kao, Hsin-Chu County (TW); Yi-Hsien Ko, Hsin-Chu County (TW); Hsin-Chia Chen, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 384 days.

(21) Appl. No.: 14/450,377

(22) Filed: Aug. 4, 2014

(65) Prior Publication Data

US 2015/0116480 A1    Apr. 30, 2015

(30) Foreign Application Priority Data

Oct. 28, 2013  (TW) ............................. 102139011 A
Nov. 4, 2013   (CN) ........................ 2013 1 0541245

(51) Int. Cl.
*H04N 7/18*    (2006.01)
*G08G 1/16*    (2006.01)
*G06K 9/00*    (2006.01)
*G05D 1/02*    (2006.01)

(52) U.S. Cl.
CPC ................................ *G05D 1/0246* (2013.01)

(58) Field of Classification Search
None
See application file for complete search history.

(56) References Cited

U.S. PATENT DOCUMENTS

| | | | | |
|---|---|---|---|---|
| 8,331,652 B2* | 12/2012 | Yoon | ................ | G06K 9/00664 382/153 |
| 2008/0193009 A1* | 8/2008 | Sonoura | ................ | G01S 5/0294 382/153 |
| 2011/0172822 A1* | 7/2011 | Ziegler | .................... | B25J 5/007 700/259 |
| 2012/0069131 A1* | 3/2012 | Abelow | ............... | G06Q 10/067 348/14.01 |
| 2012/0296511 A1* | 11/2012 | More | .................... | G05D 1/0225 701/26 |

(Continued)

FOREIGN PATENT DOCUMENTS

| | | |
|---|---|---|
| CN | 1798958 A | 7/2006 |
| CN | 101794349 A | 8/2010 |

(Continued)

*Primary Examiner* — Frederick Bailey
(74) *Attorney, Agent, or Firm* — Hauptman Ham, LLP

(57) ABSTRACT

There is provided a mobile carrier and an auto following system using the mobile carrier. The mobile carrier is capable of capturing at least an image of a guiding light source and automatically following the guiding light source based on the captured image of the guiding light source. The mobile carrier is further disposed with a mobile light source for a remote image sensing device to capture an image of the mobile light source while the mobile carrier cannot capture the image of the guiding light source, so that the mobile carrier can be guided by a control signal provided according to the captured image of the mobile light source.

26 Claims, 3 Drawing Sheets

(56) References Cited

U.S. PATENT DOCUMENTS

| | | | | |
|---|---|---|---|---|
| 2013/0024065 A1* | 1/2013 | Chiu | .................... | G05D 1/027 |
| | | | | 701/26 |
| 2013/0342652 A1* | 12/2013 | Kikkeri | .................... | B25J 9/104 |
| | | | | 348/46 |
| 2014/0028805 A1* | 1/2014 | Tohme | ................. | G01C 15/002 |
| | | | | 348/47 |
| 2014/0306894 A1* | 10/2014 | Lee | .................... | G06F 3/03543 |
| | | | | 345/166 |
| 2015/0192914 A1* | 7/2015 | Slupik | .................... | G05B 15/02 |
| | | | | 700/275 |

FOREIGN PATENT DOCUMENTS

| | | |
|---|---|---|
| CN | 102411368 A | 4/2012 |
| CN | 103170980 A | 6/2013 |
| TW | 201007200 A | 2/2010 |

\* cited by examiner

ADAPTED MOBILE CARRIER AND AUTO FOLLOWING SYSTEM

RELATED APPLICATIONS

The present application is based on and claims priority to Taiwanese Application Number 102139011, filed Oct. 28, 2013 and China Application Serial Number 201310541245.0, filed Nov. 4, 2013, the disclosure of which is hereby incorporated by reference herein in its entirety.

BACKGROUND

1. Field of the Disclosure

This disclosure generally relates to an adapted mobile carrier and an auto following system and, more particularly, to an auto following system based on image detection and tracking technologies.

2. Description of the Related Art

The auto following system of mobile carriers has been used in the golf field in recent days. The mobile carrier can be used to carry golf clubs and automatically follow players by using the auto following function.

The traditional adapted mobile carrier and the auto following system thereof mainly receive real-time coordinate of a player provided by a global positioning system (GPS) to allow the mobile carrier to be guided to the periphery of the player according to the real-time coordinate.

However, although the global positioning system can provide a real-time position, an exact real-time position can not be provided. Furthermore, as the cost and power consumption of components associated with the global positioning system are higher, the requirement of users can not be fully satisfied when the global positioning system is applied to outdoor auto following systems. In addition, the global positioning system can only be applied to outdoor environment but the auto following function for indoor applications can not be provided.

SUMMARY

The present disclosure provides a mobile carrier capable of automatically tracking and following a guiding device.

The present disclosure further provides a mobile carrier that may be controlled manually by the user when unable to automatically track and follow a guiding device.

One embodiment of the present disclosure provides an adapted mobile carrier configured to track a guiding light source. The adapted mobile carrier has an axis and includes a sensing module and a mobile module. The sensing module includes a first image sensor and a second image sensor, wherein the first image sensor is disposed at a first side of the axis and configured to sense the guiding light source and generate at least one first image, and the second image sensor is disposed at a second side of the axis and configured to sense the guiding light source and generate at least one second image. The mobile module includes a driving unit configured to control turning of a travel direction, a travel speed and/or a travel time interval of the mobile module according to imaging positions of the guiding light source in the first image and the second image.

Another embodiment of the present disclosure provides an adapted mobile carrier configured to track a guiding light source. The adapted mobile carrier includes a sensing module and a mobile module. The sensing module includes at least one first image sensor and an auxiliary image sensor, wherein the first image sensor has a non-wide angle lens and is configured to sense the guiding light source and generate at least one non-wide angle image, and the auxiliary image sensor has a wide angle lens and is configured to sense the guiding light source and generate at least one wide angle image. The mobile module includes a driving unit configured to control turning of a travel direction of the mobile module according to an imaging position of the guiding light source in the wide angle image, or control the turning of the travel direction, a travel speed and a travel time interval of the mobile module according to an imaging position of the guiding light source in the non-wide angle image.

Another embodiment of the present disclosure provides an auto following system including a mobile carrier and a guiding device. The mobile carrier includes at least one mobile light source and a mobile module, wherein the mobile module receives a guiding signal through a driving unit to control at least one of turning of a travel direction, a travel speed and a travel time interval. The guiding device includes a sensing module, wherein the sensing module includes at least one guiding image sensor configured to sense the mobile light source, generate at least one guiding image and generate the control signal according to an imaging feature of the mobile light source in the guiding image.

Another embodiment of the present disclosure provides an auto following system including a guiding device and a mobile carrier. The guiding device includes a guiding light source and a sensing module having at least one guiding image sensor configured to sense a mobile light source, generate at least one guiding image and generate a guiding signal according to an imaging feature of the mobile light source in the guiding image. The mobile carrier includes the mobile light source, a sensing module including a first image sensor and a second image sensor, wherein the first image sensor is arranged at a first side of an axis and configured to sense the guiding light source to generate at least one first image, and the second image sensor is arranged at a second side of the axis and configured to sense the guiding light source to generate at least one second image, and a mobile module including a driving unit configured to control at least one of turning of a travel direction, a travel speed and a travel time interval of the mobile module according to the guiding signal or imaging positions of the guiding light source in the first image and the second image, wherein when both the first image and the second image do not contain an imaging of the guiding light source, the driving unit receives the guiding signal configured to control at least one of the turning of the travel direction, the travel speed and the travel time interval of the mobile module.

The mobile carrier according to the embodiment of the present disclosure may capture the image of a guiding light source using image sensing technology and perform tracking according to the imaging feature of the guiding light source such that the mobile carrier may automatically follow the guiding light source. The mobile carrier may further be disposed with a mobile light source. When the guiding light source can not be captured by the mobile carrier, a remote image sensing device may be used to capture the image of the mobile light source and a control signal may be provided to guide the adapted mobile carrier according to the imaging feature of the mobile light source.

BRIEF DESCRIPTION OF THE DRAWINGS

Features of the present disclosure will become more apparent from the following detailed description when taken in conjunction with the accompanying drawings. However, the accompanying drawings and attachments are only intended to illustrate and not to limit the present disclosure.

DETAILED DESCRIPTION OF THE EMBODIMENT

Figure 1:
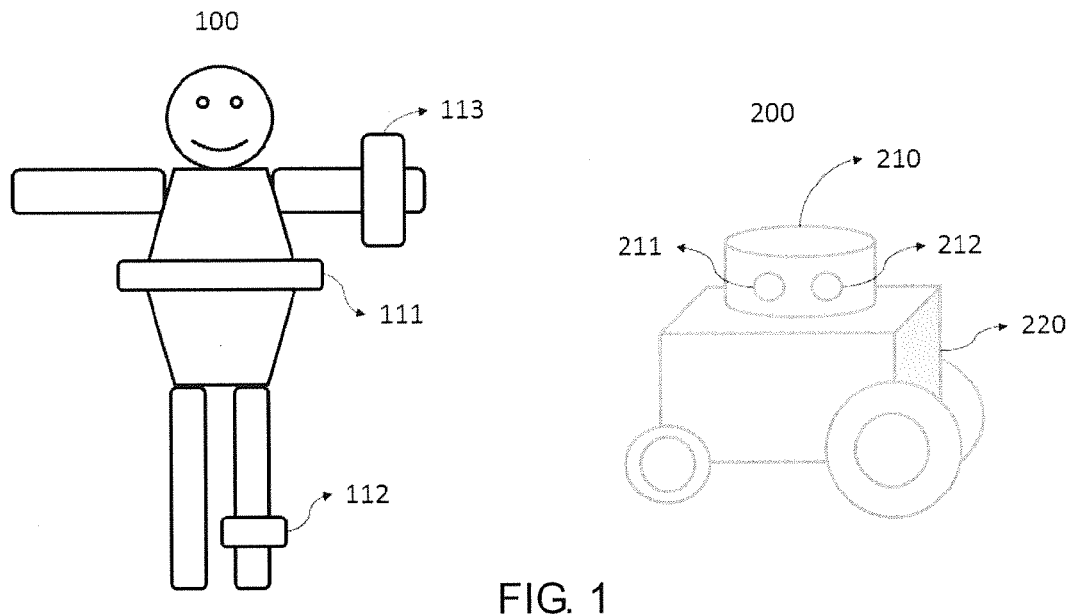
FIG. 1 shows a schematic diagram of the auto following system according to an embodiment of the present disclosure.

FIG. 1 shows a schematic diagram of the auto following system according to an embodiment of the present disclosure. The auto following system includes a target object 100 and a mobile carrier 200, wherein the mobile carrier 200 is adapted to automatically track and follow the target object 100.

The target object 100 may be a movable object, such as a golf player in the application of golf field or a kid operating a game in the application of the game system for children. The target object 100 has at least one guiding light source for the mobile carrier 200 to track and recognize. In FIG. 1, three guiding light sources 111 to 113 are shown, but they are only intended to illustrate possible positions for disposing the guiding light source. In actual application, only one guiding light source is enough and the guiding light source 111 is taken as an example for illustration hereinafter.

The mobile carrier 200 includes a sensing module 210 and a mobile module 220. The sensing module 210 is configured to sense the guiding light source 111 and generate at least one sensed image. The mobile module 220 may control turning of a travel direction, a travel speed and/or a travel time interval according to the imaging feature of the guiding light sources 111 to 113 in the sensed image captured by the sensing module 210.

Figure 2:
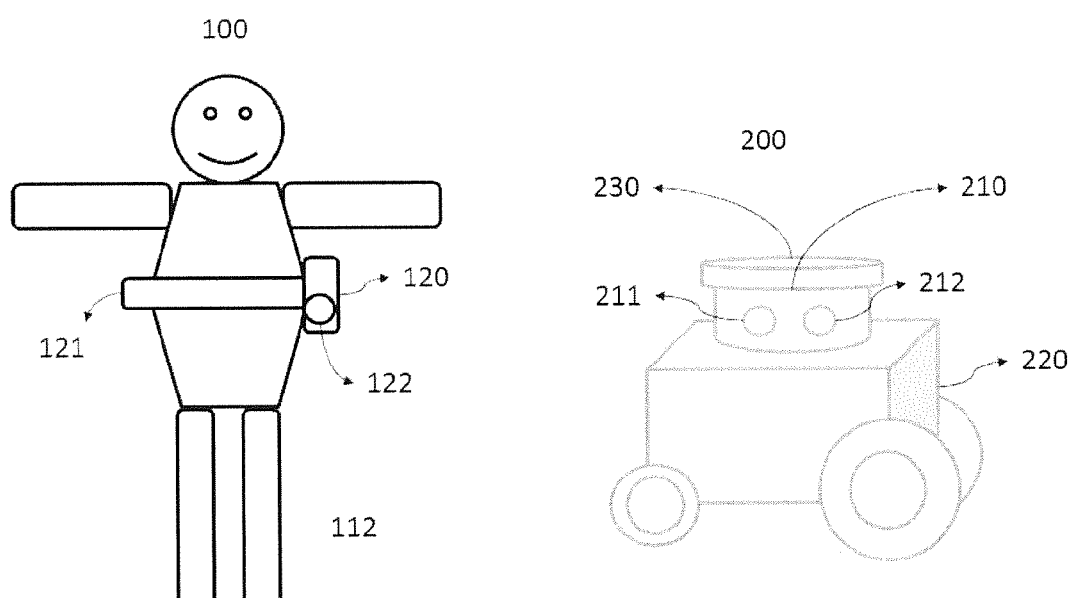
FIG. 2 shows a schematic diagram of the auto following system adapted to manual remote control according to another embodiment of the present disclosure.

The sensing module 210 includes at least one image sensor, e.g. two image sensors 211 and 212 being shown in FIG. 2 as an example. The image sensors 211 and 212 preferably may sense specific spectrum, e.g. an infrared optical filter being disposed in front of the camera lens so as to sense infrared light only. Meanwhile, the guiding light sources 111 to 113 of the target object 100 are infrared light sources.

When the target object 100 is a user, as the user may turn his/her body during operation, the user may not always face the mobile carrier 200 with the same side. Accordingly, the guiding light sources 111 to 113 preferably are arranged as a circular light source or able to emit at least plane light. For example, the guiding light sources 111 to 113 may include a dot light source and a set of fibers (not shown), wherein the dot light source is arranged at an incident surface of the fibers such that when the dot light source emits light, the fibers are illuminated. By disposing the fibers around the waist (guiding light source 111), the leg (guiding light source 112) or the hand (guiding light source 113) of the user (target object 100), a circular light source is formed. Accordingly, no matter which side of the user is faced by the mobile carrier 200, the guiding light sources 111 to 113 may be sensed effectively. In another embodiment, the guiding light sources 111 to 113 may be formed by a laser light source in association with a half-cylindrical lens (not shown). As a plane light may be generated when the laser light source projects a linear laser light onto the half-cylindrical lens, the purpose of forming the circular light source may be achieved by only disposing a plurality of guiding light sources on the waist, leg or hand. In an alternative embodiment, the guiding light sources 111 to 113 may be formed by an active light source in association with a light guide (not shown), wherein the light guide is carried by the target object 100, and one side of the light guide close to the target object 100 is a reflection surface and the other side of the light guide far from the target object 100 is a transparent structure such that the reflected light of the active light source reflected by the reflection surface is emitted toward a direction leaving the target object 100. More specifically, the guiding light sources 111 to 113 may be any proper structure without particular limitation as long as a circular light source is formed.

In order to facilitate the recognition performed by the image sensors 211 and 212, the guiding light sources 111 to 113 may emit light of a specific wavelength and specific flicker frequency or may have a specific pattern or shape. The sensing module 210 may recognize the guiding light sources 111 to 113 according to the imaging shape or pattern of the guiding light sources 111 to 113 in the captured image or the imaging frequency of the guiding light sources 111 to 113 appearing in successive captured images to accordingly identify imaging positions of the guiding light sources 111 to 113.

In addition to move the mobile carrier 200 and perform the turning, the mobile module 220 may further control the sensing module 210 to rotate through a rotating member so as to allow the image sensors 211 and 212 of the sensing module 210 to capture the imaging of the guiding light sources 111 to 113 quickly. In addition, the mobile carrier 200 may further include other member(s) for rotating the sensing module 210 and said member herein is taken a part of the mobile module 220.

The mobile module 220 may include a driving unit (not shown) configured to receive a plurality of images captured by the sensing module 210 or a control signal generated from the imaging feature of the images and to control the turning of the travel direction, the travel speed and/or the travel time interval according to the control signal or the imaging feature of the images.

As the mobile carrier 200 senses the guiding light sources 111 to 113 of the target object 100 through the image sensors 211 and 212 in outdoor environment, the image sensors 211 and 212 may fail due to the influence of ambient light sources. For example, the image sensors 211 and 212 sense strong light or the power of the guiding light sources 111 to 113 of the target object 100 is too low to have enough brightness such that the image sensors 211 and 212 may not be able to successively capture the imaging of the guiding light sources 111 to 113.

Referring to FIG. 2, it shows a schematic diagram of the auto following system adapted to manual control according to another embodiment of the present disclosure. In this embodiment, when the image sensors 211 and 212 are not able to successfully capture the imaging of the guiding light sources 111 to 113, the user may operate the mobile carrier by remote control manually.)

The main difference between the embodiment of FIG. 2 and FIG. 1 is that, in FIG. 2 the target object 100 includes a guiding device 120. In addition to the guiding light source 121, the guiding device 120 also has an image sensor 122, wherein the guiding light source 121 and the image sensor 122 may be arranged on the same body or separately.

Meanwhile, the mobile carrier 200 is disposed with a mobile light source 230. The mobile light source 230 may have an identical feature as the guiding light sources 111 to 113, e.g. identical specific wavelength, specific flicker frequency, specific shape or pattern such that the image sensor 122 may recognize the mobile light source 230 in the captured image. Preferably, the mobile light source 230 may form a circular light source to allow the image sensor 122 of the target object 100 may sense the mobile light source 230 at any side of the mobile carrier 200.

In this embodiment, the guiding device 120 generates a guiding signal and the guiding signal is provided to the driving unit of the mobile module 220 so as to control the turning of the travel direction, the travel speed and/or the travel time interval, wherein the guiding signal may be the image captured by the guiding device 120 or the imaging feature of the mobile light source generated according to the captured image. Furthermore, the guiding signal may also be a control command generated directly according to the imaging feature and the control command is served as the guiding signal to be provided to the driving unit of the mobile module 220.

Figure 2A:
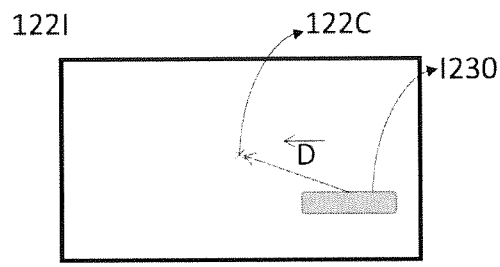
FIG. 2A shows a schematic diagram of an image captured by the sensing module in an operating condition according to an embodiment of the present disclosure.

Referring to FIG. 2A, it shows an image frame 1221, which contains a light source imaging 1230 of the mobile light source 230, captured by the image sensor 122, wherein the image frame 1221 may have, for example, a center point 122C. Accordingly, the guiding device 120 (e.g. an image processor therein) may calculate a vector $\vec{D}$ between a position of the light source imaging 1230 (e.g. a center or gravity center thereof) and the center point 122C to be served as the guiding signal. It should be mentioned that the shape of the light source imaging 1230 in the image frame 1221 is only intended to illustrate and not to limit the present disclosure.

Embodiments of FIGS. 1 and 2 may be combined together. That is, the guiding device 120 may be disposed on the target object 100 configured to provide the guiding light source 121 and the image sensor 122, and the mobile carrier 200 may include the sensing module 210, the mobile module 220 and the mobile light source 230.

Figure 3:
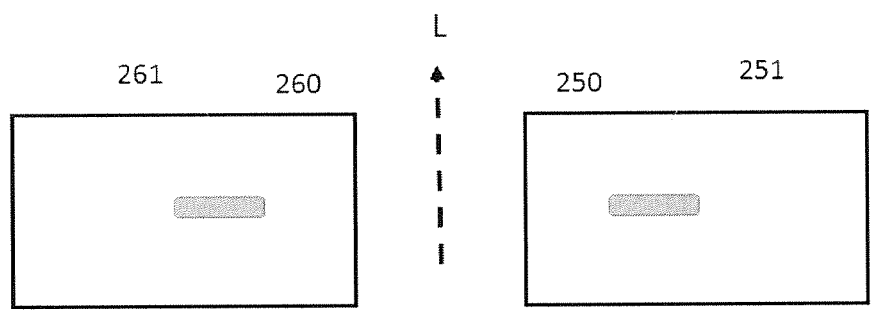
FIG. 3 shows a schematic diagram of an image captured by the sensing module in another operating condition according to an embodiment of the present disclosure.

FIG. 3 shows a schematic diagram of images captured by the sensing module 210 in an operating condition according to an embodiment of the present disclosure, wherein the image 250 is captured by the image sensor 211 and the image 260 is captured by the image sensor 212. The image 250 contains the imaging 251 of the guiding light source 111 and the image 260 contains the imaging 261 of the guiding light source 111. The dashed line L is referred to a central axis between the image sensors 211 and 212. Generally, the image sensors 211 and 212 are arranged at two sides of the mobile carrier 200 such that an arrow direction of the central axis may represent a front direction of the mobile carrier 200. In the embodiment below, as an example the image sensors 211 and 212 are respectively arranged at a first side and a second side of the mobile carrier 200. For illustration purpose, the side in the image 250 and image 260 close to the dashed line L is referred to an inner side and the side far from the dashed line L is referred to an outer side.

When the mobile carrier 200 faces the target object 100 in front, the guiding light source 111 is symmetrical in the images 250 and 260, i.e. the distance of the imaging 251 in the image 250 from the dashed line L is equal to the distance of the imaging 261 in the image 260 from the dashed line L.

Figure 4A:
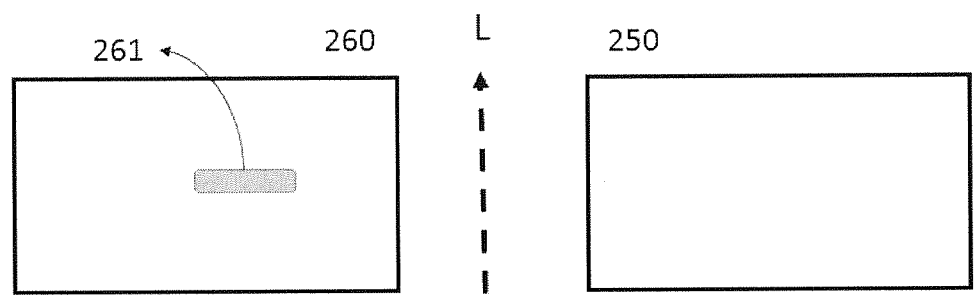
FIG. 4A shows a schematic diagram of an image captured by the sensing module in another operating condition according to an embodiment of the present disclosure.

FIG. 4A shows a schematic diagram of images captured by the sensing module in another operating condition according to an embodiment of the present disclosure, wherein the image 250 does not contain the imaging of the guiding light source 111 while the image 260 contains the imaging of the guiding light source 111. It means that in this operating condition the mobile carrier 200 does not face the guiding light source 111 in front and the guiding light source 111 is located closer to the second side of the mobile carrier 200. Accordingly, the mobile module 220 of the mobile carrier 200 drives the mobile carrier 200 to turn to the second side by a first angle to allow the mobile carrier 200 to be able to face the guiding light source 111 in front.

In this operating condition, the first angle of the turning of the mobile module 220 may be a constant. When the image 250 does not contain the imaging of the guiding light source 111 and the image 260 contains the imaging of the guiding light source 111, the mobile module 220 drives the mobile carrier 200 to turn to the second side by a first angle (e.g. 10 degrees). When the image 250 still does not contain the imaging of the guiding light source 111 after turning, the mobile carrier 200 is turned to the second side by the first angle again.

In addition, in this operating condition the first angle of the turning of the mobile module 220 may be a variable value, e.g. adjustable according to the imaging position of the imaging 261 of the guiding light source 111 in the image 260. For example, when the imaging 261 is closer to the outer side of the image 260 with respect to the dashed line L, it means that the guiding light source 111 is farther from the front of the mobile carrier 200 such that the turning angle of the mobile module 220 may be at as a larger first angle (e.g. 15 degrees), whereas when the imaging 261 is closer to the inner side of the image 260 with respect to the dashed line L, it means that the guiding light source 111 is closer to the front of the mobile carrier 200 such that the turning angle of the mobile module 220 may be set as a smaller first angle (e.g. 5 degrees).

Figure 4B:
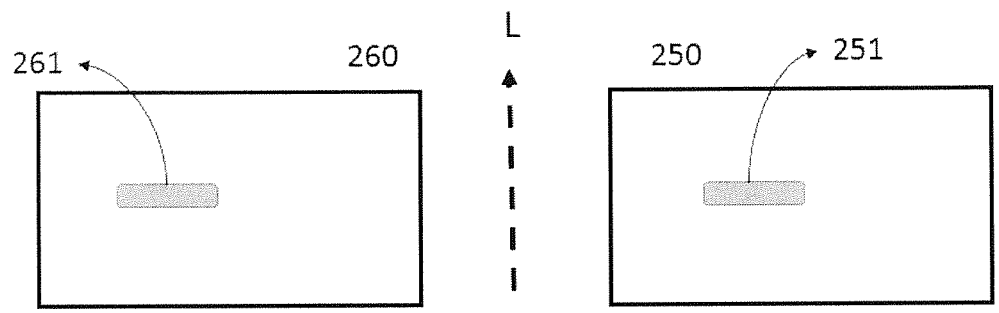
FIG. 4B shows a schematic diagram of an image captured by the sensing module in another operating condition according to an embodiment of the present disclosure.

FIG. 4B shows a schematic diagram of images captured by the sensing module in another operating condition according to an embodiment of the present disclosure, wherein the image 250 contains the imaging 251 of the guiding light source 111 while the image 260 also contains the imaging 261 of the guiding light source 111. As the guiding light source 111 deviates to the second side of the mobile carrier 200, the imaging 251 at the first side is closer to the inner side of the image 250 with respect to the dashed line L and the imaging 261 at the second side is closer to the outer side of the image 260 with respect to the dashed line L.

In this operating condition, the mobile module 220 may drive the mobile carrier 200 to turn to the second side by a second angle, wherein the second angle may be a constant or a valuable value. Preferably, the second angle is a valuable value, and the second angle may be determined by the mobile module 220 according to image positions of the imaging 251 and 261 in the images 250 and 260. For example, when the imaging 261 is closer to the outer side of the associated image than the imaging 251, the mobile module 220 drives the mobile carrier 200 to turn to the second side.

The second angle to be turned may be determined according to the imaging position of the imaging 251 or the imaging 261. For example, when the mobile module 220 is moving to the first side, the second angle may be determined according to the imaging position of the imaging 251 in the image 250. In addition, the second angle to be turned may be determined together by imaging positions of the imaging 251 and imaging 261. For example, the second angle may be determined by comparing a difference between the imaging 215 and imaging 261 far from the outer side of the associated image. For example, when a pixel distance of the imaging 251 from the outer side of the image 250 is 10-pixels and a pixel distance of the imaging 261 from the outer side of the image 260 is 5-pixels, the difference between the imaging 215 and imaging 261 far from the outer side of the associated image is 5-pixels toward the second side and thus the mobile module 220 may seta larger second angle (e.g. 15 degrees). When a pixel distance of the imaging 251 from the outer side of the image 250 is 10-pixels and a pixel distance of the imaging 261 from the outer side of the image 260 is 8-pixels, the difference between the imaging 215 and imaging 261 far from the outer side of the associated image is 2-pixels toward the second side and thus the mobile module 220 may set a smaller second angle (e.g. 5 degrees).

Furthermore, in other operating conditions, both of the image 250 and the image 260 may not contain the imaging of the guiding light source 111, and thus the driving unit of the mobile module 220 may enter a searching mode in which the mobile module 220 drives the turning of the mobile carrier 200 clockwise or counterclockwise, or it is possible that the mobile module 220 directly drives the sensing module 210 to rotate clockwise or counterclockwise in order to search the guiding light source 111. In the searching mode, the driving unit may leave the searching mode when any one of the image sensors 211 and 212 sense the guiding light source 111, or the searching mode may be ended only when both of the image sensors 211 and 212 sense the guiding light source 111.

In one embodiment, the sensing module 210 can perform the clockwise or counterclockwise rotation with respect to the mobile module 220 only in the searching mode, but in travelling (not the searching mode) the sensing module 210 can not rotate with respect to the mobile module 220 so as to correctly control the travel direction of the mobile carrier 200.

Figure 5A:
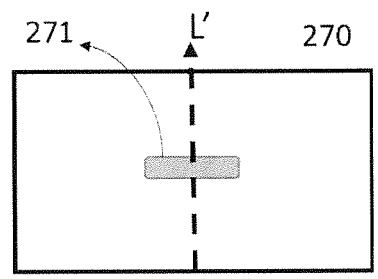
FIG. 5A shows a schematic diagram of an image captured by the sensing module in another operating condition according to an embodiment of the present disclosure.
Figure 5B:
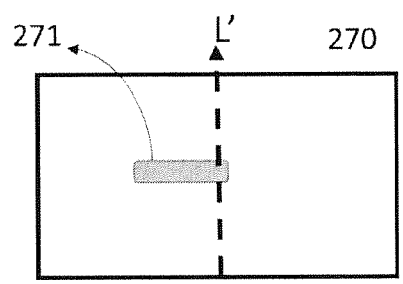
FIG. 5B shows a schematic diagram of an image captured by the sensing module in another operating condition according to an embodiment of the present disclosure.

In another embodiment, the mobile module 200 may also determine the turning angle according to a single image captured by the sensing module 210, i.e. the sensing module 210 includes only one image sensor 211 or 212. For example, FIG. 5A shows an image 270 captured by the image sensor, wherein the image 270 may have a central line L' pre-stored in a storing unit. When the mobile carrier 200 faces the target object 100 in front, the imaging 271 of the guiding light source 111 is symmetrical with respect to the central line L' in the image 270 as shown in FIG. 5A. When the mobile carrier 200 does not face the target object 100 in front, the imaging 271 of the guiding light source 111 deviates with respect to the central line L' in the image 270 as shown in FIG. 5B, and thus the driving unit of the mobile carrier 200 drives the mobile carrier 200 to turn an angle to allow the mobile carrier 200 to face the guiding light source 111 in front. In should be mentioned that although FIG. 5B shows that the imaging 271 deviates leftward with respect to the central line L', the imaging 271 may deviate rightward with respect to the central line L' when relative positions of the mobile carrier 200 and the guiding light source 111 are different.

In one operating condition, when the imaging size or imaging intensity of the imaging 251 or 261 of the guiding light source 111 contained in the image 250 or image 260 exceeds a first threshold, it means that the mobile carrier 200 is close to the target object 100 and thus the travel speed of the mobile carrier 200 may be decreased. When the imaging size or imaging intensity of the imaging 251 or 261 exceeds a second threshold, it means that the mobile carrier 200 is at the periphery of the target object 100 and thus a stopping mode may be entered. In the stopping mode, the mobile carrier 200 may be stopped immediately or stopped after turning the travel direction toward a predetermined angle and traveling for a predetermined distance or a predetermined time interval. In this manner, the mobile carrier 200 may stop at a side of the target object 100 to allow the user to take out the things carried by the mobile carrier 200.

In another embodiment, when the imaging size or imaging intensity of the imaging 251 or 261 of the guiding light source 111 contained in the image 250 or image 260 exceeds a first threshold, it means that the mobile carrier 200 is close to the target object 100 and thus the mobile carrier 200 may be stopped. Then, the mobile carrier 200 identifies whether the target object 100 is standing still (no change of size or intensity) for a predetermined time interval according to the imaging size or imaging intensity of the imaging 251 or 261 of the guiding light source 111 contained in the image 250 or image 260. If the answer is yes, the mobile carrier 200 starts to travel toward the target object 100 again till the imaging size or imaging intensity of the imaging 251 or 261 exceeds a second threshold, which means that the mobile carrier 200 is at the periphery of the target object 100, and the mobile carrier 200 is stopped to allow the user to take out the things carried by the mobile carrier 200. In the present disclosure, the mobile carrier 200 may be set not to leave from the target object 100 actively.

In one embodiment, the driving unit of the mobile module 200 may directly ignore the first threshold, i.e. directly comparing the imaging size or imaging intensity of the imaging 251 or 261 with the second threshold.

In addition, in order to allow the mobile carrier 200 always stays at the same side of the target object 100, e.g. behind the target object 100, the guiding light sources 111 to 113 may be arranged to have different features in different directions. For example, a half of the mobile carrier 200 emits light in a first frequency and the other half emits light in a second frequency. i.e. the light source of different features being used to emit the fiber, light guide or lens. Meanwhile, the mobile carrier 200 has the mechanism to identify the first frequency and the second frequency, and to travel in a direction to allow most part of the captured imaging of the guiding light source to be the first frequency or the second frequency, e.g. 80% of the imaging being associated with the first frequency or the second frequency, so as to maintain the relative spatial relation between the target object 100 and the mobile carrier 200.

As mentioned above, the mobile carrier and the auto following system in the present disclosure may sense the imaging of the guiding light source by the image sensor and the mobile carrier may control the movement according to the imaging feature (e.g. position, intensity, size and so on) so as to achieve the purpose of auto following. When the guiding light source can not be sensed or the user has other requirements, the user may sense the imaging of the mobile light source arranged on the mobile carrier by using guiding image sensor and the guiding control signal is sent to the mobile carrier according to the imaging feature to accordingly control the movement of the mobile carrier.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An adapted mobile carrier configured to track a guiding light source, the adapted mobile carrier having an axis and comprising:
   a sensing module comprising a first image sensor and a second image sensor, wherein the first image sensor is disposed at a first side of the axis and configured to sense the guiding light source and generate at least one first image, the second image sensor is disposed at a second side of the axis and configured to sense the guiding light source and generate at least one second image; and
   a mobile module comprising a driving unit configured to control at least one of turning of a travel direction, a travel speed and a travel time interval of the mobile module according to imaging positions of the guiding light source in the first image and the second image.

2. The adapted mobile carrier as claimed in claim 1, wherein when the first image contains an imaging of the guiding light source and the second image does not contain an imaging of the guiding light source, the driving unit controls the travel direction of the mobile module to turn to the first side.

3. The adapted mobile carrier as claimed in claim 2, wherein an angle of the turning is determined according to the imaging position of the guiding light source in the first image, and the angle is larger when the imaging position in the first image is farther from the axis.

4. The adapted mobile carrier as claimed in claim 1, wherein when the imaging positions of the guiding light source in the first image and the second image are not symmetric and the imaging position in the first image is farther from the axis than the imaging position in the second image, the driving unit controls the travel direction of the mobile module to turn to the first side.

5. The adapted mobile carrier as claimed in claim 1, wherein when an imaging size of the guiding light source in the first image or the second image is larger than a first threshold, the travel speed of the mobile module is decreased.

6. The adapted mobile carrier as claimed in claim 1, wherein when an imaging size of the guiding light source in the first image or the second image is larger than a second threshold, the mobile module enters a stopping mode.

7. The adapted mobile carrier as claimed in claim 6, wherein when entering the stopping mode, the mobile module stops traveling immediately.

8. The adapted mobile carrier as claimed in claim 6, wherein when entering the stopping mode, the mobile module turns the travel direction by a predetermined angle and stops travelling after traveling for a predetermined distance or a predetermined time interval.

9. The adapted mobile carrier as claimed in claim 1, wherein when both the first image and the second image do not contain an imaging of the guiding light source, the mobile module enters a searching mode.

10. The adapted mobile carrier as claimed in claim 9, wherein when entering the searching mode, the mobile module drives the adapted mobile carrier to rotate clockwise or counterclockwise or drives the sensing module to rotate clockwise or counterclockwise through a rotating member, and the searching mode is ended when the imaging of the guiding light source is captured by the first image or the second image.

11. The adapted mobile carrier as claimed in claim 1, wherein the sensing module is configured to identify the imaging positions of the guiding light source according to an imaging shape or an imaging pattern in a captured image or an imaging frequency in successive captured images.

12. An adapted mobile carrier configured to track a guiding light source, the adapted mobile carrier comprising:
   a sensing module comprising at least one first image sensor and an auxiliary image sensor, wherein the first image sensor comprises a non-wide angle lens and is configured to sense the guiding light source and generate at least one non-wide angle image, and the auxiliary image sensor comprises a wide angle lens and is configured to sense the guiding light source and generate at least one wide angle image; and
   a mobile module comprising a driving unit configured to control turning of a travel direction of the mobile module according to an imaging position of the guiding light source in the wide angle image, or control the turning of the travel direction, a travel speed and a travel time interval of the mobile module according to an imaging position of the guiding light source in the non-wide angle image.

13. The adapted mobile carrier as claimed in claim 12, wherein when the non-wide angle image does not contain an imaging of the guiding light source, the driving unit controls the turning of the travel direction of the mobile module according to the imaging position of the guiding light source in the wide angle image.

14. The adapted mobile carrier as claimed in claim 12, wherein when an imaging size of the guiding light source in the non-wide angle image is larger than a first threshold, the travel speed of the mobile module is decreased.

15. The adapted mobile carrier as claimed in claim 12, wherein when an imaging size of the guiding light source in the non-wide angle image is larger than a second threshold, the mobile module enters a stopping mode.

16. The adapted mobile carrier as claimed in claim 15, wherein when entering the stopping mode, the mobile module stops traveling immediately.

17. The adapted mobile carrier as claimed in claim 15, wherein when entering the stopping mode, the mobile module turns the travel direction by a predetermined angle and stops travelling after traveling for a predetermined distance or a predetermined time interval.

18. The adapted mobile carrier as claimed in claim 12, wherein when both the non-wide angle image and the wide angle image do not contain an imaging of the guiding light source, the mobile module enters a searching mode.

19. The adapted mobile carrier as claimed in claim 18, wherein when entering the searching mode, the mobile module drives the adapted mobile carrier to rotate clockwise or counterclockwise or drives the sensing module to rotate clockwise or counterclockwise through a rotating member, and the searching mode is ended when the imaging of the guiding light source is captured by the wide angle image or the non-wide angle image.

20. The adapted mobile carrier as claimed in claim 12, wherein the sensing module is configured to identify the image position of the guiding light source according to an imaging shape or an imaging pattern in a captured image or an imaging frequency in successive captured images.

21. An auto following system comprising:
a mobile carrier comprising at least one mobile light source and a mobile module, wherein the mobile module receives a guiding signal through a driving unit to control at least one of turning of a travel direction, a travel speed and a travel time interval; and
a guiding device comprising a sensing module, wherein the sensing module comprises at least one guiding image sensor configured to sense the mobile light source, generate at least one guiding image and generate the control signal according to an imaging feature of the mobile light source in the guiding image.

22. The auto following system as claimed in claim 21, wherein the guiding device generates the control signal according to an imaging size of the mobile light source in the guiding image configured to control the travel speed and the travel time interval of the mobile module.

23. The auto following system as claimed in claim 21, wherein the guiding device generates the control signal according to an imaging position of the mobile light source in the guiding image configured to control the turning of the travel direction of the mobile module.

24. An auto following system comprising:
a guiding device comprising:
a guiding light source; and
a sensing module comprising at least one guiding image sensor configured to sense a mobile light source, generate at least one guiding image and generate a guiding signal according to an imaging feature of the mobile light source in the guiding image; and
a mobile carrier comprising:
the mobile light source;
a sensing module comprising a first image sensor and a second image sensor, wherein the first image sensor is arranged at a first side of an axis and configured to sense the guiding light source to generate at least one first image, and the second image sensor is arranged at a second side of the axis and configured to sense the guiding light source to generate at least one second image; and
a mobile module comprising a driving unit configured to control at least one of turning of a travel direction, a travel speed and a travel time interval of the mobile module according to the guiding signal or imaging positions of the guiding light source in the first image and the second image;
wherein when both the first image and the second image do not contain an imaging of the guiding light source, the driving unit receives the guiding signal configured to control at least one of the turning of the travel direction, the travel speed and the travel time interval of the mobile module.

25. The auto following system as claimed in claim 24, wherein the guiding light source comprises a dot light source and a fiber, and the light source is arranged at an incident surface of the fiber configured to illuminate the fiber, and the guiding light source is configured to be arranged on a waist or a leg of a user and form a circular light source.

26. The auto following system as claimed in claim 24, wherein the guiding light source comprises a laser light source and a half-cylindrical lens configured to form a plane light source.

* * * * *